US010928754B2

(12) United States Patent
Sambhy et al.

(10) Patent No.: US 10,928,754 B2
(45) Date of Patent: *Feb. 23, 2021

(54) RELEASE FLUID COMPOSITION

(71) Applicant: Xerox Corporation, Norwalk, CT (US)

(72) Inventors: Varun Sambhy, Pittsford, NY (US); Santokh S. Badesha, Pittsford, NY (US); Alexander N. Klymachyov, Webster, NY (US); David S. Derleth, Webster, NY (US); Mark A. Arnould, Rochester, NY (US); John R. Lambie, Ontario, NY (US); James E. Quigley, Manchester, NY (US)

(73) Assignee: Xerox Corporation, Norwalk, CT (US)

( * ) Notice: Subject to any disclaimer, the term of this patent is extended or adjusted under 35 U.S.C. 154(b) by 180 days.

This patent is subject to a terminal disclaimer.

(21) Appl. No.: 15/952,865

(22) Filed: Apr. 13, 2018

(65) Prior Publication Data
US 2019/0317438 A1    Oct. 17, 2019

(51) Int. Cl.
  *C08K 5/544* (2006.01)
  *G03G 15/20* (2006.01)
  *C09D 183/14* (2006.01)
  *C09D 183/08* (2006.01)

(52) U.S. Cl.
  CPC ....... *G03G 15/2025* (2013.01); *C09D 183/08* (2013.01); *C09D 183/14* (2013.01); *C08K 5/544* (2013.01); *G03G 2215/2048* (2013.01)

(58) Field of Classification Search
  CPC ... C09D 183/08; C08K 5/544; G03G 15/2025
  See application file for complete search history.

(56) References Cited

U.S. PATENT DOCUMENTS

| 4,127,872 A | * 11/1978 | Shen Lo | C07F 7/0838 |
| | | | 369/276 |
| 4,257,699 A | 3/1981 | Lentz | |
| 5,017,432 A | 5/1991 | Eddy et al. | |
| 5,061,965 A | 10/1991 | Ferguson et al. | |
| 5,166,031 A | 11/1992 | Badesha et al. | |
| 5,281,506 A | 1/1994 | Badesha et al. | |
| 5,366,772 A | 11/1994 | Badesha et al. | |
| 5,370,931 A | 12/1994 | Fratangelo et al. | |

(Continued)

FOREIGN PATENT DOCUMENTS

JP    H08313348 A    11/1996

OTHER PUBLICATIONS

U.S. Appl. No. 15/952,891, Notice of Allowance dated Nov. 30, 2018, 8 pages.

(Continued)

*Primary Examiner* — Mark S Kaucher
(74) *Attorney, Agent, or Firm* — Hoffman Warnick LLC (57) ABSTRACT

Disclosed herein is a release fluid, a fuser member and an image forming apparatus. The release fluid is a blend an amino functional silicone fluid and a non-functional silicone fluid. The amount of the amino functional silicone fluid is from about 10 weight percent to about 90 weight percent of the release fluid. The amount of the non-functional silicone fluid is from about 10 weight percent to about 90 weight percent of the release fluid. The amount of silanol (Si—OH) is less than 200 ppm in the release fluid.

19 Claims, 3 Drawing Sheets

(56) References Cited

U.S. PATENT DOCUMENTS

| | | | |
|---|---|---|---|
| 6,183,929 B1 * | 2/2001 | Chow | C09D 183/08 |
| | | | 399/333 |
| 6,300,287 B1 | 10/2001 | Ishikawa et al. | |
| 10,214,662 B1 * | 2/2019 | Sambhy | G03G 15/36 |
| 2003/0224178 A1 | 12/2003 | Chen et al. | |

OTHER PUBLICATIONS

U.S. Appl. No. 15/952,908, Final Office Action dated Jul. 16, 2020, 10 pgs.

* cited by examiner

RELEASE FLUID COMPOSITION

CROSS REFERENCE TO RELATED APPLICATIONS

This application relates to commonly assigned copending application Ser. No. 15/952,908, RELEASE FLUID ADDITIVES, filed simultaneously herewith and incorporated by reference herein. This application relates to commonly assigned copending application Ser. No. 15/952,891, METHOD OF PRINTING, IMAGE FORMING APPARATUS AND PRINT, filed simultaneously herewith and incorporated by reference herein.

BACKGROUND

Field of Use

The disclosure herein is directed to release fluids or agents that are useful in release coating in toner-based technologies.

Background

In electrostatographic reproducing apparatuses, including digital, image on image, and contact electrostatic printing apparatuses, a light image of an original to be copied is typically recorded in the form of an electrostatic latent image upon a photosensitive member and the latent image is subsequently rendered visible by the application of electroscopic thermoplastic resin particles and pigment particles, or toner. The residual toner image can be either fixed directly upon the photosensitive member or transferred from the member to another support, such as a sheet of plain paper with subsequent fixing or fusing.

In order to fix or fuse the toner onto a support member permanently by heat, it is necessary to elevate the temperature of the toner to a point at which the constituents of the toner coalese and become tacky. This heating action causes the toner to flow to some extent into the fibers or pores of the support member. Thereafter, as the toner cools, solidification of the toner causes the toner to be bonded firmly to the support member.

Typically, the thermoplastic resin particles are fused to the substrate by heating to a temperature of from about 90° C. to about 200° C. or higher, depending on the softening range of the particular resin used in the toner. It may be undesirable, however, to increase the temperature of the substrate substantially higher than about 250° C. because the substrate may discolor or scorch or ignite at such elevated temperatures, particularly when the substrate is paper.

Several approaches to thermal fusing of electroscopic toner images have been described. These methods include providing the application of substantial heat and pressure concurrently by various means, including fuser members such as a roll pair maintained in pressure contact, a belt member in pressure contact with a roll, a belt member in pressure contact with a heater, and the like. Heat can be applied by heating one or both of the rolls, plate members, belt members, or the like. The fuser member can be in the form of a roller, drum, belt, sheet, film, drelt (a hybrid between a roll and a belt), and the like. The fusing of the toner particles occurs when the proper combination of heat, pressure, and/or contact for the optimum time period are provided. The balancing of these variables to bring about the fusing of the toner particles can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support.

Different types of release fluids or agents can be used to provide sufficient release. However, the sufficiency of the release depends on the selected release fluid or agent and an appropriate combination of the fuser member surface material and any filler to be incorporated into the fuser member surface material.

It would be desirable to have release fluids that extend fuser member life.

SUMMARY

According to various embodiments, there is provided a release fluid. The release fluid is a blend of an amino functional silicone fluid and an non-functional silicone fluid. The amino functional silicone fluid is represented by:

where Q represents —$R_1$—X, wherein $R_1$ represents an alkyl group having from about 1 to about 10 carbons, X represents —$NH_2$ or —$NHR_2NH_2$ with $R_2$ having the same description as $R_1$. In the amino functional silicon fluid, n is an integer from 1 to 50 and m is an integer from 10 to 5,000. The non-functional silicone fluid is represented by:

where r is an integer from 10 to 5,000. $T_1$ and $T_2$ are methyl (—CH3), or hydroxyl (—OH). The amount of the amino functional silicone fluid is from about 10 weight percent to about 90 weight percent of the release fluid and the amount of the non-functional silicone fluid is from about 10 weight percent to about 90 weight percent of the release fluid. An amount of silanol (Si—OH) is less than 200 ppm in the release fluid. The amount of silanol (Si—OH) is defined as moles of Si—OH moieties over total moles of silicon atoms.

According to various embodiments, there is provided an image forming apparatus. The image forming apparatus includes a photoreceptor having a photosensitive layer; a charging device which charges the photoreceptor; an exposure device which exposes the charged photoreceptor to light, thereby forming an electrostatic latent image on a surface of the photoreceptor and a developer station for developing a toner image on a surface of the photoreceptor. The image forming apparatus includes at least one transfer device for transferring the toner image to a recording medium and a fuser station for fixing the toner images transferred to the recording medium, onto the recording medium by heating the recording medium, thereby forming a fused image on the recording medium. The fuser station includes a fuser member, a pressure member and a release fluid in combination with said fuser member. The release fluid release fluid is a blend of an amino functional silicone fluid and a non-functional silicone fluid. The amino silicone functional fluid is represented by:

wherein Q represents —R$_1$—X, wherein R$_1$ represents an alkyl group having from about 1 to about 10 carbons, X represents —NH$_2$ or —NHR$_2$NH$_2$ with R$_2$ having the same description as R$_1$. In the amino functional silicon fluid n is an integer from 1 to 50 and m is an integer from 10 to 5,000. The non-functional silicone fluid is represented by:

wherein r is an integer from 10 to 5,000. T$_1$ and T$_2$ are methyl (—CH3), or hydroxyl (—OH). The amount of the amino functional silicone fluid is from about 10 weight percent to about 90 weight percent of the release fluid. The amount of the non-functional silicone fluid is from about 10 weight percent to about 90 weight percent of the release fluid. The amount of silanol (Si—OH) is less than 200 ppm in the release fluid. The amount of silanol (Si—OH) is defined as moles of Si—OH moieties over total moles of silicon atoms.

A further aspect described herein is a fuser member. The fuser member includes a substrate; an outer layer covering the substrate; and a release fluid on the outer layer. The release fluid is a blend an amino functional silicone fluid and a non-functional silicone fluid. The amino silicone functional fluid is represented by:

where Q represents —R$_1$—X, wherein R$_1$ represents an alkyl group having from about 1 to about 10 carbons, X represents —NH$_2$ or —NHR$_2$NH$_2$ with R$_2$ having the same description as R$_1$. In the amino functional silicon fluid n is an integer from 1 to 50 and m is an integer from 10 to 5,000. The non-functional silicone fluid is represented by:

where r is an integer from 10 to 5,000. T$_1$ and T$_2$ are methyl (—CH3), or hydroxyl (—OH). The amount of the amino functional silicone fluid is from about 10 weight percent to about 90 weight percent of the release fluid. The amount of the non-functional silicone fluid is from about 10 weight percent to about 90 weight percent of the release fluid. The amount of silanol (Si—OH) is less than 200 ppm in the release fluid. The amount of silanol (Si—OH) is defined as moles of Si—OH moieties over total moles of silicon atoms. The outer layer of the fuser member is a silicone elastomer, a fluorosilicone elastomer, a fluoroelastomer, a fluorinated hydrocarbon polymer, a fluorinated hydrocarbon or a silicone polymer blend.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Although embodiments of the disclosure herein are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of resistors" may include two or more resistors.

Figure 1:
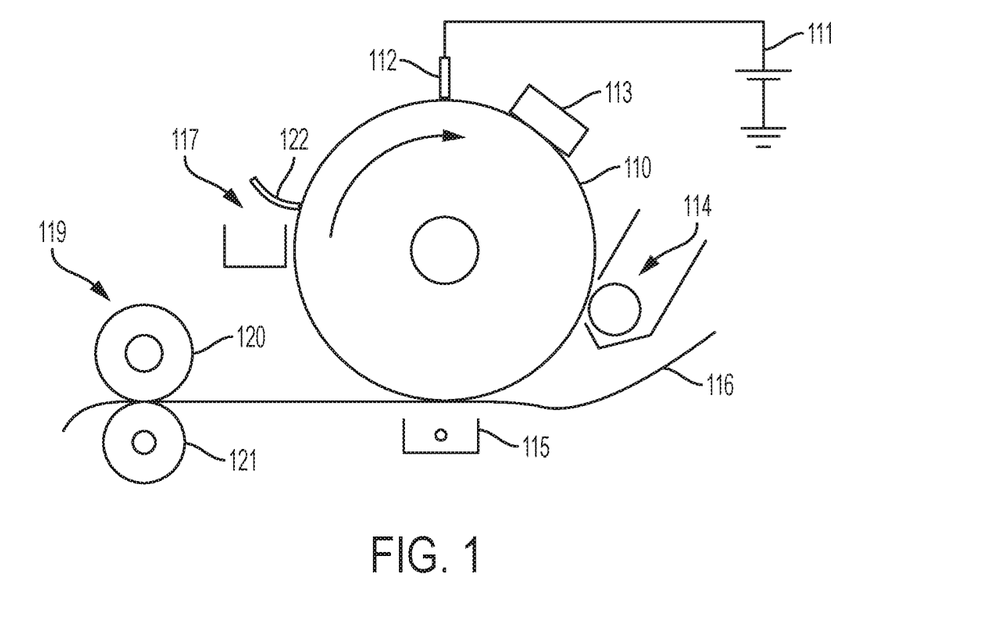
FIG. 1 is a schematic illustration of an image apparatus in accordance with the present disclosure.

Referring to FIG. 1, in a typical electrostatic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 110 is charged on its surface by means of a charger 112 to which a voltage has been supplied from power supply 111. The photoreceptor 110 is then imagewise exposed to light from an optical system or an image input apparatus 113, such as a laser and light emitting diode, to form an electrostatic latent image on the photoreceptor 110. Generally, the electrostatic latent image is developed by bringing a developer mixture from developer station 114 into contact herewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 116 by transfer means 115, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 116 advances to fusing station 119, depicted in FIG. 1 as fuser roll 120 and pressure roll 121 (although any other fusing member components such as fuser belt in contact with a pressure roll, fuser roll in contact with pressure belt, and the like, are suitable for use with the present apparatus), where the developed image is fused to copy sheet 116 by passing copy sheet 116 between the fusing and pressure members, thereby forming a permanent image. Alternatively, transfer and fusing can be effected by a transfix application. Photoreceptor 110, subsequent to transfer, advances to cleaning station 117, where any toner left on photoreceptor 110 is cleaned therefrom by use of a blade 122 (as shown in FIG. 1), brush, or other cleaning apparatus. Alternatively, transfer and fusing can be effected by a transfix application.

Figure 2:
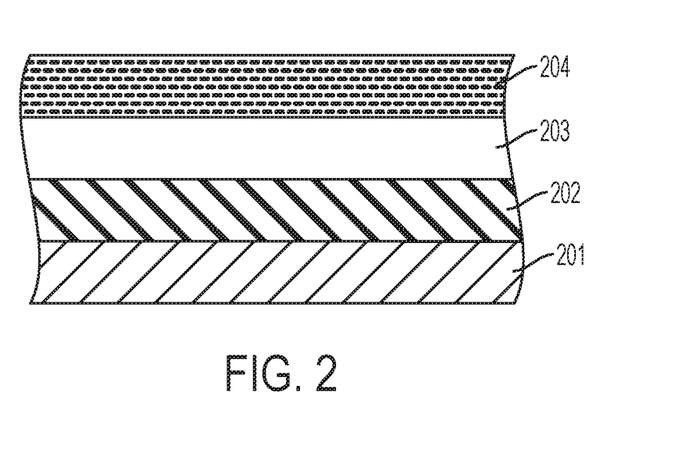
FIG. 2 is an enlarged, side view of an embodiment of a fuser member, showing a fuser member with a substrate, intermediate layer, outer layer, and release coating layer.

FIG. 2 is an enlarged schematic view of an embodiment of a fuser member, demonstrating the various possible layers. As shown in FIG. 2, substrate 201 includes an optional intermediate layer 202. Intermediate layer 202 can be, for example, a rubber such as silicone rubber or other suitable rubber material. On the intermediate layer 202 is positioned an outer layer 203. Positioned on the outer layer 203 is an outermost release fluid or agent 204, described in more detail below.

The outer layer 203 may be selected from the group consisting of: a silicone elastomer, a fluorosilicone elastomer, a fluoroelastomer, a fluorinated hydrocarbon polymer, a fluorinated hydrocarbon and silicone polymer blend, silicone copolymers, and crosslinked blends of fluorinated hydrocarbon copolymers and silicone copolymers.

Examples of the outer surface 203 of the fuser system members include fluoroelastomers and hydrofluoroelastomers.

Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein, these elastomers are from the class of: 1) copolymers of vinylidenefluoride and hexafluoropropylene; 2) terpolymers of vinylidenefluoride, hexafluoropropylene and tetrafluoroethylene; and 3) tetrapolymers of vinylidenefluoride, hexafluoropropylene, tetrafluoroethylene and cure site monomer, are known commercially under various designations as VITON A®, VITON B®, VITON E®, VITON E 60C®, VITON E430®, VITON 910®, VITON GH®; VITON GF®; and VITON ETP®. The VITON® designation is a Trademark of E.I. DuPont de Nemours, Inc. The cure site monomer can be 4-bromoperfluorobutene-1,1,1-dihydro-4-bromo-perfluorobutene-1,3-bromoper-fluoropropene-1,1,1-dihydro-3-bromoperfluoro-propene-1, or any other suitable, known cure site monomer commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS®, a poly(propylenetetra-fluoroethylene), and FLUOREL II® (LII900), a poly(propylene-tetrafluoroethylene-vinylidenefluoride), both also available from 3M Company, as well as the Tecnoflons identified as FOR-60KIR®, FOR-LHF®, NM® FOR-THF®, FOR-TFS®, TH®, and TN505®, available from Montedison Specialty Chemical Company.

The fluoroelastomers VITON GH® and VITON GF® have relatively low amounts of vinylidenefluoride. The VITON GF® and Viton GH® have about 35 weight percent of vinylidenefluoride, about 34 weight percent of hexafluoropropylene and about 29 weight percent of tetrafluoroethylene with about 2 weight percent cure site monomer.

The amount of fluoroelastomer compound in solution in the outer layer solutions, in weight percent total solids, is from about 10 to about 25 percent, or from about 16 to about 22 percent by weight of total solids. Total solids as used herein include the amount of fluoroelastomer, dehydrofluorinating agent and optional adjuvants and fillers, including metal oxide fillers. In addition to the fluoroelastomer, the outer layer may comprise a fluoropolymer or other fluoroelastomer blended with the above fluoroelastomer. Examples of suitable polymer blends include the above fluoroelastomer, blended with a fluoropolymer selected from the group consisting of polytetrafluoroethylene and perfluoroalkoxy. The fluoroelastomer can also be blended with non-fluorinated ethylene or non-fluorinated propylene.

An inorganic particulate filler may be used in connection with the polymeric outer layer, in order to provide anchoring sites for the functional groups of the fuser agent. Examples of suitable fillers include inorganic fillers such as silicas or a metal-containing filler, such as a metal, metal alloy, metal oxide, metal salt, or other metal compound. The general classes of metals which can be used include those metals of Groups 1b, 2a, 2b, 3a, 3b, 4a, 4b, 5a, 5b, 6b, 7b, 8, and the rare earth elements of the Periodic Table. For example, the filler can be an oxide of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel and alloys thereof. Other specific examples include inorganic particulate fillers of aluminum oxide, and cupric oxide; reinforcing and non-reinforcing calcined alumina and tabular alumina, respectively, along with silicas. Other fillers include various forms of carbon, such as carbon nanotubes, graphene or other forms of carbon; and doped metal oxides such as antimony-doped tin oxide, indium-doped tin oxide, and the like. The filler may include just one filler or a mixture of fillers.

The thickness of the outer layer 203 of the fuser member herein is from about 10 to about 250 micrometers, or from about 5 to about 100 micrometers, or from about 1 to about 50 micrometers.

Optional intermediate adhesive layers and/or intermediate polymer or elastomer layers may be applied to achieve desired properties and performance objectives of the embodiments herein. The intermediate layer(s) may be present between the substrate and the outer polymeric surface. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); and the like. Another specific example is Dow Corning Sylgard 182. An adhesive intermediate layer may be selected from, for example, epoxy resins and polysiloxanes.

There may also be provided an adhesive layer between the substrate and the intermediate layer. There may also be an adhesive layer between the intermediate layer and the outer layer. In the absence of an intermediate layer, the outer layer may be bonded to the substrate via an adhesive layer. The thickness of the intermediate layer is from about 0.5 to about 20 mm, or from about 1 to about 10 mm, or from about 3 to about 5 mm.

In embodiments, the release fluids or agents described herein are provided onto the outer layer of the fuser member via a delivery mechanism such as a delivery roll. The delivery roll is partially immersed in a sump, which houses the release fluid or agent.

The release fluids or agents are renewable in that the release fluid or agent is housed in a holding sump and provided to the fuser roll when needed, optionally by way of a release fluid donor roll in an amount of from about 0.1 to about 20 mg/copy, or from about 1 to about 12 mg/copy. The system by which fuser release fluid is provided to the fuser roll via a holding sump and, optionally, a donor roll is well known. The release fluid may be present on the fuser member surface in a continuous or semi-continuous phase. The release fluid in the form of a film is in a continuous phase and continuously covers the fuser member.

Figure 3:
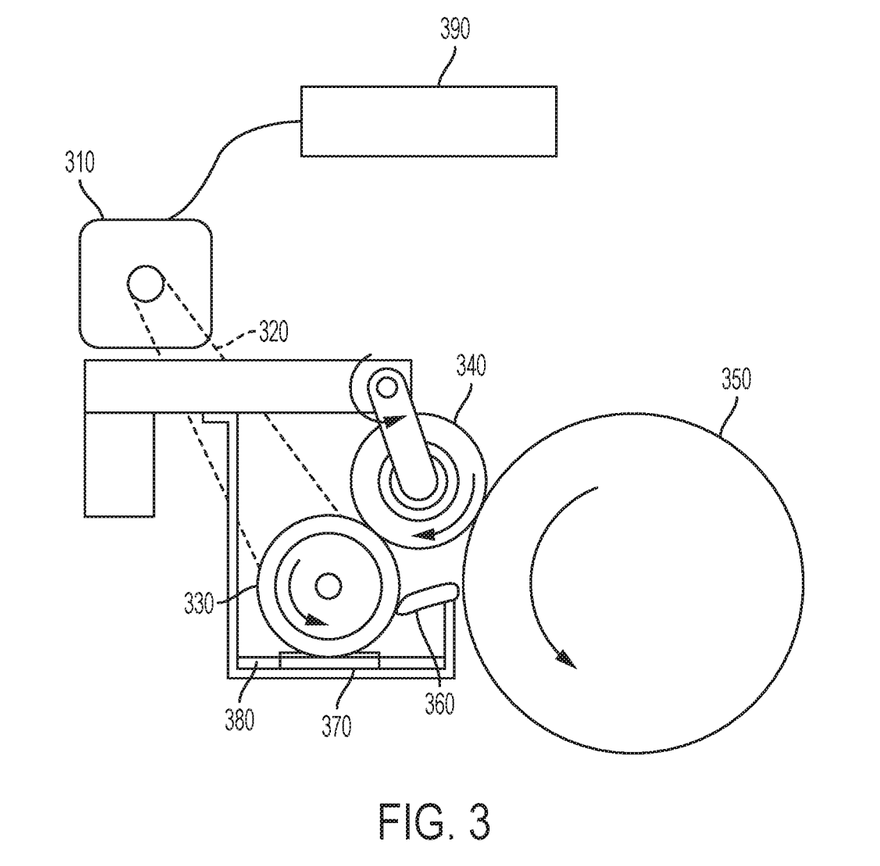
FIG. 3 is schematic illustration of a release fluid apparatus for providing release fluid to a fuser member.

FIG. 3 illustrates an embodiment of a variable speed meter (VSM) for delivering release fluid. FIG. 3 shows a drive motor 310 attached by a belt 320 to a metering roll 330 such that drive motor 310 turns metering roll 330. A controller 390 controls drive motor 310. Metering roll 330 picks up release fluid 380 from a release fluid pan 370. Release fluid 380 adheres to the surface of metering roll 330, is spread in a layer of correct thickness by a metering blade 360, and is then transferred to a donor roll 340. The release fluid 380 is then transferred from donor roll 340 to a fuser roll (or belt) 350. Fuser roll 350 can correspond to the top roll 120 in fusing station 119 shown in FIG. 1, which is the roll that contacts the unfused toner on the printed sheet. As a result, the apparatus shown in FIG. 3 applies a uniform layer of release fluid or agent to the fuser roll in order to reduce adhesion of toner to the fuser roll surface.

The term "drive" or "drive motor" can apply to any electromechanical arrangement capable of providing a desired rotational speed, and could include, for example, simply an electrical motor, such as a brush, brushless, or stepper motor, with or without accompanying transmission mechanisms. Also, any roll, including a fuser roll, donor roll, or metering roll, can, in alternate embodiments, be in the form of a belt entrained around two or more rollers.

A traditional release agent management system (RAM) applies release fluid to the fuser roll at an idle release fluid rate (or no release fluid) when a print job is not running, and at a steady state running release fluid rate when a print job is running. These systems change from the idle release fluid rate to the steady state running release fluid rate when a print job is started.

Embodiments herein propose to use a blend containing an amino functional silicone fluid and a non-functional silicone flued. The release fluid blend enables good clear toner fix.

The blended release fluid described herein includes a blend of Formula I (amino functional silicone fluid) and Formula II (non-functional silicone fluid).

Examples of suitable amino functional silicone fluids include those having pendant amino groups, such as those having the following Formula I:

Formula I where Q represents —$R_1$—X, wherein $R_1$ represents an alkyl group having from about 1 to about 10 carbons. X represents —$NH_2$ or —$NHR_2NH_2$ with $R_2$ having the same description as $R_1$. In Formula I, n is an integer from 1 to 50, m is an integer from 10 to 5,000. $T_1$ and $T_2$ are methyl (—CH3), or hydroxyl (—OH) group. The structure in Formula I can be a block or a random copolymer. An amount of silanol (Si—OH) is defined as a molar ratio of Si—OH moieties over total number of silicon atoms. The amount of silanol is less than 200 ppm in the release fluid. In embodiments the amount of silanol is less than 150 ppm of the release fluid, or the amount of silanol is less than 50 ppm of the release fluid. The amount of silanol (Si—OH) is defined as moles of Si—OH moieties over total moles of silicon atoms.

In embodiments in Formula I, n is from about 1 to about 50, or from about 1 to about 25 or from about 1 to about 10; m is from about 10 to about 5,000, or from 50 to 1000 or from 100 to 1000. In embodiments, n is from about 1 to about 10 providing pendant groups that are mono-amino, di-amino, tri-amino, tetra-amino, penta-amino, hexa-amino, hepta-amino, octa-amino, nona-amino, deca-amino, and the like.

In embodiments, X represents —NH$_2$, and in other embodiments, R$_1$ is propyl. In embodiments, X represents —NHR$_2$NH$_2$, and in embodiments, R$_2$ is propyl.

In embodiments, the Formula I has a molecular weight (Mw) of from about 1,000 to about 100,000, or from about 1,000 to about 10,000 daltons and a viscosity of from about 10 to about 1,500 cS, or from about 50 to about 1,000 cS.

the amount of Formula II is from 10 weight percent to 90 weight percent. In embodiments, the amount of Formula II is from 15 weight percent to 85 weight percent or from 20 weight percent to about 80 weight percent of the release fluid blend.

In embodiments, the release fluid of the blend of Formula I and Formula II has a specific amine content and viscosity. For example, the release fluid has a mole percent amine of about 0.01 to about 0.9, or from about 0.03 to about 0.6, or from about 0.08 to about 0.50, or from 0.09 to 0.40, or from 0.15 to 0.25. Mole percent amine refers to the relationship: 100×(moles of amine groups/moles of silicon atoms).

In embodiments, the release fluid of the blend of Formula I and Formula II has a viscosity of from about 50 to about 600 or from about 60 to about 500 or from about 70 to about 400 centipoise. The silicone release fluid can have terminal silanol Si—OH groups during synthesis of the silicone release fluid.

The silicone release fluid described herein can form silanol Si—OH terminal end chains because of scission of the release fluid as shown schematically below;

Examples of suitable non-functional silicone release fluids include those having the following Formula II:

Formula II

In Formula II, r is an integer from 10 to 5,000. T$_1$ and T$_2$ are methyl (—CH3), or hydroxyl (—OH). The structure in Formula II can be a block or a random copolymer.

In embodiments in Formula II, r is from about 10 to about 5,000, or from 50 to 1000 or from 100 to 1000.

In embodiments, Formula II has a molecular weight (Mw) of from about 1,000 to about 100,000, or from about 1,000 to about 10,000 daltons and a viscosity of from about 10 to about 1,500 cS, or from about 50 to about 1,000 cS.

The amount of Formula I in the release fluid blend is from 10 weigh percent to about 90 weight percent of the blended release fluid. In embodiments, the amount of Formula I is from 15 weight percent to 85 weight percent in the release fluid blend, or from 20 weight percent to about 80 weight percent in the blended release fluid blend. In embodiments, Scission of the release fluid may occur during release fluid synthesis, storage of the release fluid or during operation of the electrostatographic machine. When scission of the release fluid occurs, terminal silanol (Si—OH) groups are formed as shown above.

The silanol amount in release fluid can be measured using NMR. Free silanol in the release agent can react/interact with toner components thereby increasing toner component offset to the fuser roll. The amount of silanol in the release fluid greatly impact fuser roll life.

Specific embodiments will now be described in detail. These examples are intended to be illustrative, and not limited to the materials, conditions, or process parameters set forth in these embodiments. All parts are percentages by solid weight unless otherwise indicated.

Examples

Measuring Silanol Level in Release Fluid

Silanol (terminal Si—OH groups) were measured by 1H NMR using a Bruker AV500 NMR spectrometer. 100 µL of release fluid were dissolved in 500 µL deuterated chloroform and 30 µL of trichloroacetyl isocyanate (TAIC) were added to the solution. Upon addition TAIC reacts with Si—OH forming urethane and shifts adjacent dimethyl peaks downfield, separating them from the bulk of the methyl peaks therefore allowing quantification of the underlying Si—OH groups.

Fuser Roll Life Machine Test Results

Print tests were conducted on a 4 station iGen machine running CMYK (cyan, magenta, yellow and black) toner. Fuser roll life was evaluated by running prints on the iGen machine and counting the number of prints to fuser roll failure. A stress print designed to stress the fuser roll and result in early roll failure was printed repeatedly on the iGen machine till failure. The paper used in the print test was an offset grade coated paper, brand named Creator. Failure occurs when toner components (resin, pigments and additives) build up on the fuser roll and results in image quality defect showing up on the print. If the release fluid is ineffective in protecting the fuser roll, contaminants may build up on the roll over time. These contaminants could be components of the toner or components of the paper or dust and dirt present in general ambient environment. As contaminants build up on fuser roll, they eventually transfer to the prints in unwanted locations and result in image quality defects. These defects may show up as streaks or bands on the prints, or they may show up as patches on the print, or they may show up as gloss differentials on the prints.

Three different fuser release fluids were tested in iGen machine for fuser roll life. Control 1 was the current mainline release fluid for iGen, labeled Control 1. Release Fluid A (RF-A) and Release Fluid B (RF-B) were test silicone release fluid provided by Wacker. Table 1 shows the amount of amino functional silicone fluid and non-functional silicone fluid in each fluid tested.

TABLE 1

| Release Fluid | Weight percent of amino functional silicone fluid of Formula I in Release Fluid | Weight percent of non-functional silicone fluid of Formula II in Release Fluid |
| --- | --- | --- |
| Control 1 | ~55% | ~45% |
| RF-A | ~15% | ~85% |
| RF-B | ~15% | ~85% |

The release fluid delivery RAM and fuser components were cleaned thoroughly before swapping and testing release fluids. The stress print was printed on the iGen machine repeatedly till the fuser roll failed. Failure is defined as when at least 5 consecutive print shows a defect in image quality, e.g. unwanted streak or a patch or gloss differential. The properties and average life of fuser roll with different release fluids is provided in Table 2 below. The average print to failure number is an average of at least two replicate tests. It can be clearly seen that lowering the silanol content of the release fluid, improves fuser roll life. RF-B with the lowest silanol level gave longest fuser roll life. RF-A had lower silanol level than Control 1, but still has somewhat lower fuser roll life. This can be explained by difference in viscosity between Control 1 and RF-A. It is generally known silicone release fluids with higher viscosity would protect the fuser roll better than release fluids with lower viscosity. Higher viscosity of the release fluid leads to the RAM release fluid delivery system delivering more release fluid to the fuser roll. Hence, even though RF-A has lower silanol level than Control 1, the effect is somewhat confounded by higher viscosity of Control 1. But comparing Control 1 and RF-2, we clearly see that in spite of lower viscosity of RF-B, RF-B has significantly higher fuser roll life than Control 1. Also the effect of silanol level on improving fuser roll life is clear on comparing print life test data from RF-A and RF-B, both having similar viscosity and amine content, but different silanol levels. Significantly higher fuser roll life was obtained with RF-B which had lower silanol level than RF-A. The fuser roll with RF-B release oil did not fail at 243000 prints and test was suspended before roll failure to do other factors.

TABLE 2

| Release Fluid | Amine mol % | Viscosity | Silanol (ppm) NMR | Average Prints to Failure |
| --- | --- | --- | --- | --- |
| Control 1 | 0.24 | 575 cS | 550 | 50,500 |
| RF-A | 0.2 | 100 cS | 207 | 35,000 |
| RF-B | 0.20 | 100 cS | 65 | 243,000 * |

* Roll did not fail even at 243K prints- test was suspended

In summary, using release fluids with low levels of free silanol significantly improves fuser roll life. Improved fuser roll life results in significant cost savings.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A release fluid comprising a blend of an amino functional silicone fluid and a non-functional silicone fluid wherein the amino silicone functional fluid is represented by:

wherein Q represents —R$_1$—X, wherein R$_1$ represents an alkyl group having from about 1 to about 10 carbons, X represents —NHR$_2$NH$_2$ with R$_2$ having the same description as R$_1$, n is an integer from 1 to 50, m is an integer from 10 to 5,000, wherein the non-functional silicone fluid is represented by:

wherein r is an integer from 10 to 5,000, wherein T$_1$ and T$_2$ are methyl (—CH3), or hydroxyl (—OH), wherein an amount of the amino functional silicone fluid is from about 10 weight percent to about 90 weight percent of the release fluid and an amount of the non-functional silicone fluid is from about 10 weight percent to about 90 weight percent of the release fluid, wherein an amount of silanol (Si—OH) is less than 200 ppm in the release fluid.

2. The release fluid according to claim 1, wherein the Q represents an aminopropyl amine functional group.

3. The release fluid according to claim 1, wherein a mole percent of amine in the release fluid is from about 0.01 to about 0.09.

4. The release fluid according to claim 1, wherein a mole percent of amine in the release fluid is about 0.15 to about 0.25.

5. The release fluid according to claim 1, wherein the release fluid comprises a viscosity of from about 50 to about 600 centipoise.

6. The release fluid according to claim 1, wherein the amino silicone functional fluid is a block copolymer.

7. The release fluid according to claim 1, wherein the amino silicone functional fluid is a random copolymer.

8. The release fluid according to claim 1, wherein the amount of silanol (Si—OH) is less than 50 ppm in the release fluid.

9. An image forming apparatus comprising:
a photoreceptor having a photosensitive layer; a charging device which charges the photoreceptor; an exposure device which exposes the charged photoreceptor to light, thereby forming an electrostatic latent image on a surface of the photoreceptor;
a developer station for developing a toner image on a surface of the photoreceptor; at least one transfer device for transferring the toner image to a recording medium;
a fuser station for fixing the toner images transferred to the recording medium, onto the recording medium by heating the recording medium, thereby forming a fused image on the recording medium;
wherein the fuser station comprises a fuser member, a pressure member and a release fluid in combination with said fuser member, wherein said release fluid comprises a blend of an amino functional silicone fluid and a non-functional silicone fluid wherein the amino silicone functional fluid is represented by:

wherein Q represents —R₁—X, wherein R₁ represents an alkyl group having from about 1 to about 10 carbons, X represents —NHR₂NH₂ with R₂ having the same description as R₁, n is an integer from 1 to 50, m is an integer from 10 to 5,000, wherein the non-functional silicone fluid is represented by:

wherein r is an integer from 10 to 5,000, wherein T₁ and T₂ are methyl (—CH3), or hydroxyl (—OH), wherein an amount of the amino functional silicone fluid is from about 10 weight percent to about 90 weight percent of the release fluid and an amount of the non-functional silicone fluid is from about 10 weight percent to about 90 weight percent of the release fluid, wherein an amount of silanol (Si—OH) is less than 200 ppm in the release fluid.

10. The image forming apparatus according to claim 9, wherein Q represents an aminopropyl amine functional group.

11. The image forming apparatus according to claim 9, wherein a mole percent of amine in the release fluid is from about 0.01 to about 0.9.

12. The image forming apparatus according to claim 9, wherein a viscosity of the release fluid is from about 50 to about 600 centipoise.

13. The image forming apparatus according to claim 9, wherein the amino silicone functional fluid is a block copolymer.

14. The image forming apparatus according to claim 9, wherein the amino silicone functional fluid is a random copolymer.

15. A fuser member comprising:
a substrate; an outer layer covering the substrate; and a release fluid on the outer layer, the release fluid comprising a blend of an amino functional silicone fluid and a non-functional silicone fluid wherein the amino silicone functional fluid is represented by:

wherein Q represents —R₁—X, wherein R₁ represents an alkyl group having from about 1 to about 10 carbons, X represents —NHR₂NH₂ with R₂ having the same description as R₁, n is an integer from 1 to 50, m is an integer from 10 to 5,000, wherein the non-functional silicone fluid is represented by:

wherein r is an integer from 10 to 5,000, wherein T₁ and T₂ are methyl (—CH3), or hydroxyl (—OH), wherein an amount of the amino functional silicone fluid is from about 10 weight percent to about 90 weight percent of the release fluid and an amount of the non-functional silicone fluid is from about 10 weight percent to about 90 weight percent of the release fluid, wherein an amount of silanol (Si—OH) is less than 200 ppm in the release fluid, and
wherein the outer layer is selected from the group consisting of a silicone elastomer, a fluorosilicone elastomer, a fluoroelastomer, a fluorinated hydrocarbon polymer, a fluorinated hydrocarbon and silicone polymer blend.

16. The fuser member according to claim 15, wherein Q represents an aminopropyl amine functional group.

17. The fuser member according to claim 15, wherein a mole percent of amine in the release fluid is from about 0.01 to about 0.9.

18. The fuser member according to claim 15, wherein a viscosity of the release fluid is from about 50 to about 600 centipoise.

19. The fuser member according to claim 15, further comprising an intermediate layer disposed between the substrate and the outer layer.

* * * * *